United States Patent [19]

Bishop et al.

[11] Patent Number: 4,964,654
[45] Date of Patent: Oct. 23, 1990

[54] AIR BAG ASSEMBLY

[75] Inventors: Robert J. Bishop, Washington; Robert P. Fontecchio, Rochester Hills; Daniel G. Zelenak, Jr., Rochester, all of Mich.

[73] Assignee: Allied-Signal Inc., Morris Township, Morris County, N.J.

[21] Appl. No.: 350,431

[22] Filed: May 11, 1989

[51] Int. Cl.⁵ ............................................. B60R 21/16
[52] U.S. Cl. .................................... 280/743; 280/741
[58] Field of Search ............... 280/728, 729, 743, 741, 280/742, 736, 743, 727; 206/522

[56] References Cited

U.S. PATENT DOCUMENTS

| | | | |
|---|---|---|---|
| 3,756,617 | 9/1973 | Brown | 280/732 |
| 4,351,544 | 9/1982 | Ross | 280/743 |
| 4,400,010 | 8/1983 | Stutz et al. | 280/732 |
| 4,536,008 | 8/1985 | Brown, Jr. | 280/743 |
| 4,830,401 | 5/1989 | Honda | 280/743 |

Primary Examiner—Richard A. Bertsch

[57] ABSTRACT

An assembly comprising: a hollow cylindrical member or can including an opening into which a gas generator may be inserted, the gas generator of the type responsive to a control signal, for generating gas to inflate an air bag. The assembly including the air bag, for protecting, when activated, an occupant of a vehicle, comprising an inflatable bag or sack, disposed in a compacted or stored condition, during periods prior to deployment, proximate a side of the cylindrical member containing at least one aperture, the inflatable bag, including an open end disposed about the cylindrical member to receive the gas an including relatively opposing flaps extending from proximate the open end and adapted to envelop the cylindrical member, the flaps, proximate a side of the cylindrical member, away from the at least one apature, disposed in an overlapping, condition, one to the other. A band of tearable material is provided to secure the air bag in its stored or predeployment condition.

32 Claims, 5 Drawing Sheets

FIG. 1
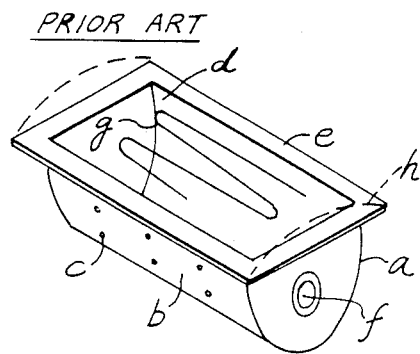
FIG. 2
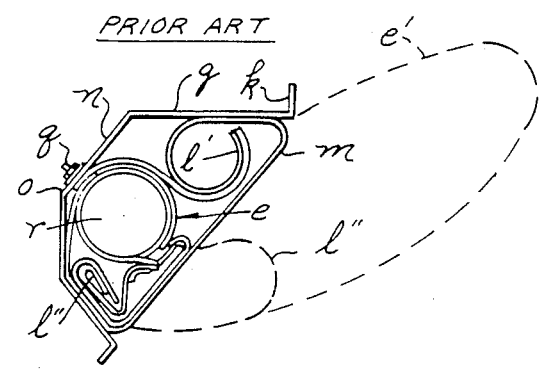
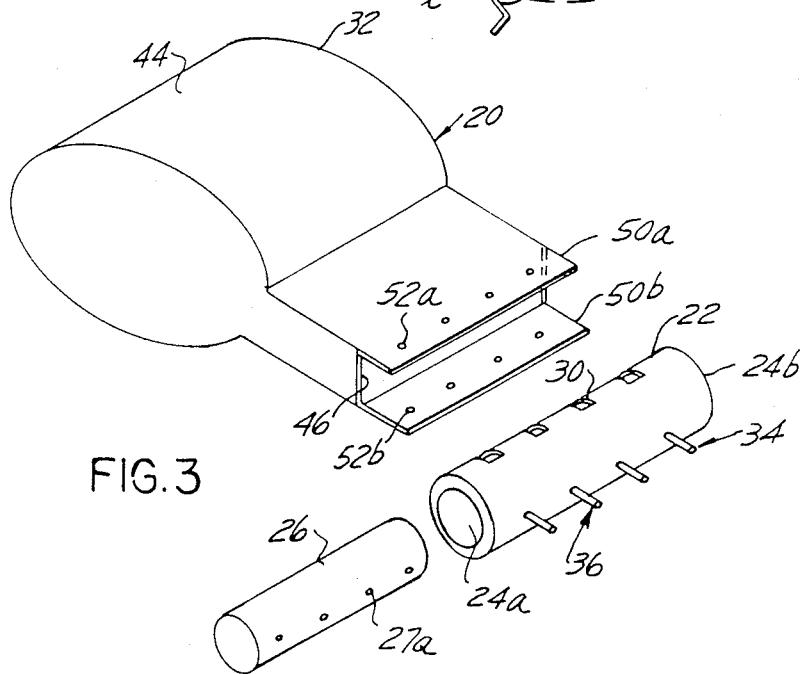
FIG. 3

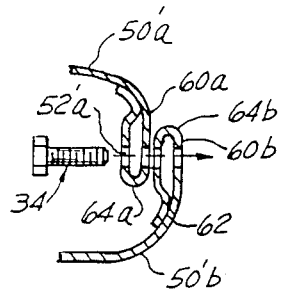
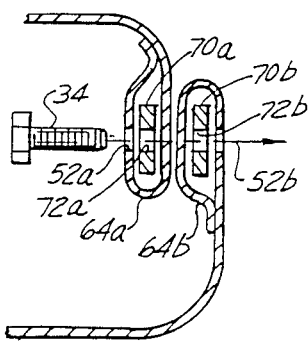
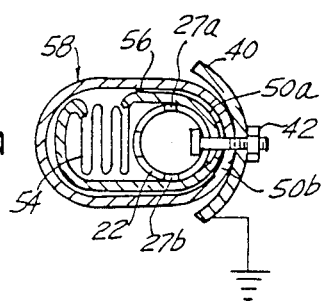
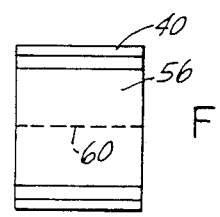
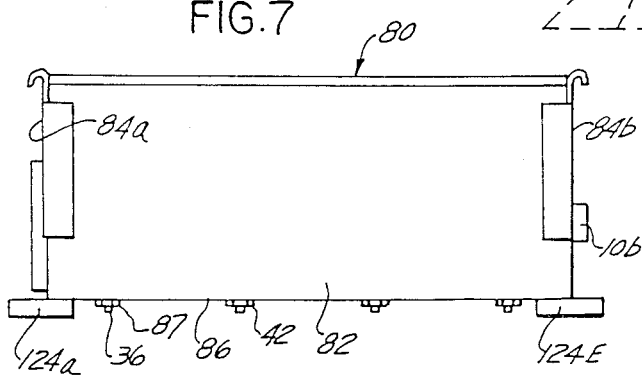
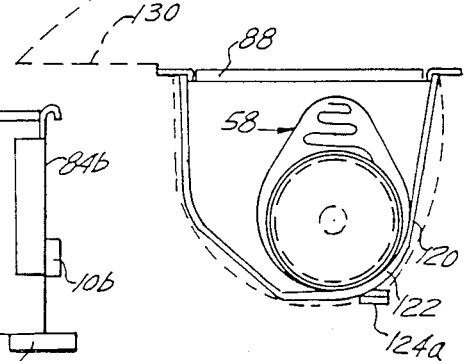

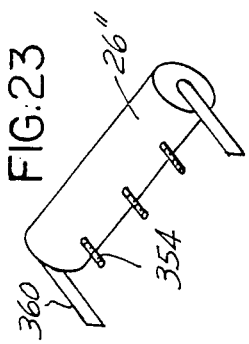
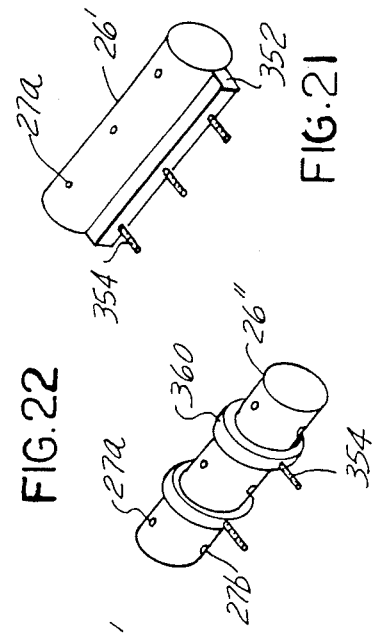
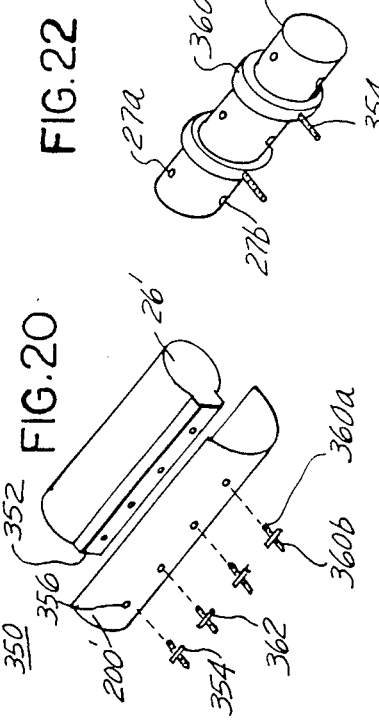
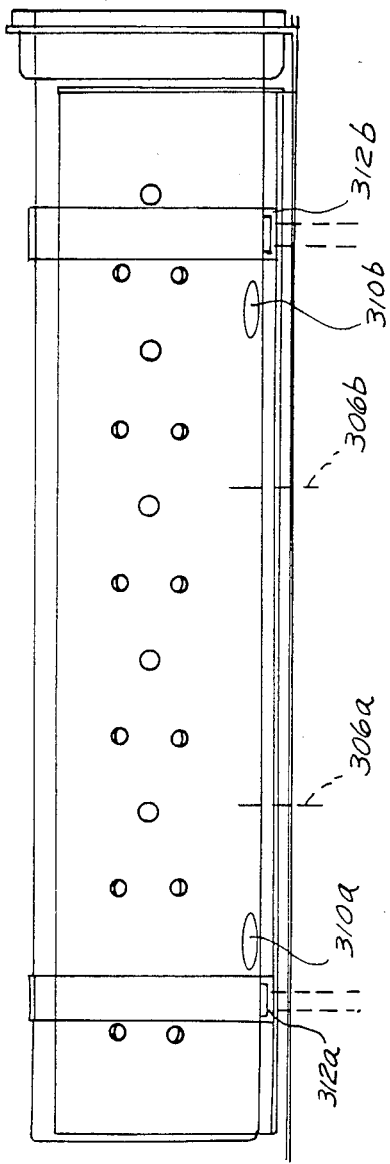

AIR BAG ASSEMBLY

BACKGROUND AND SUMMARY OF INVENTION

The present invention relates to assemblies useful in inflatable restraint systems.

Inflatable restraint systems are becoming the norm for passenger protection. A rudimentary system comprises of a crash sensor mounted to the vehicle frame and an air bag assembly positioned within the passenger compartment. Differing types of assemblies are used for driver side restraint systems and passenger side restraint systems. The present invention finds specific application with a passenger side air bag restraint system. Typically these assemblies will include an outer reaction can into which is received a gas generator. This can is an integrated, structurally sound member which absorbs and retransmits the air bag deployment forces to the vehicle. The can also supports the weight of the gas inflator and an air bag. An air bag is placed into the can in close proximity to the gas generator and a cover is placed about the outer can to secure the bag in its non-deployed or stored condition. FIG. 1 illustrates an examplary passenger side air bag assembly. This system also comprises a reaction can (a) that is typically mounted to or near the dash board or instrument panel of the vehicle. The can includes a partially enclosed side (b) having a plurality of perforations (c) and an opened end (d) surrounded by a flange (e). During assembly a gas generator (f) is secured to the can (a), thereafter an air bag (g) is mounted within the can in a manner to receive the gas generated by the gas generator (f). A cover (h) (shown in phantom line), typically of a breakable plastic material, is secured across the open end of the can i.e., on or abort the flange (e).

The assembly shown in FIG. 1 must be inserted within the vehicle during its manufacture. A deficiency inherent to this type of assembly is that the gas generator (f) must be inserted into the reaction can (a) prior to the placement of the air bag (g). As such at an early state of the fabrication of the assembly the gas generator becomes an integral portion thereof The assembly is inspected, packaged, and transported with the gas generator in place thereby subjecting the gas generator to mishandling, vibration, impact, etc. A gas generator which is always a part of a completed assembly presents an increased potential safety hazard since there exists a greater possibility that during the transportation, testing, etc. of the assembly an inadvertent activation of the gas generator and deployment of the air bag may occur.

FIG. 2 illustrates another prior art air bag assembly comprising an outer or reaction can (j) having sidewalls (not shown in FIG. 2). The outer can is adapted to fit within the dashboard or instrument panel generally shown as (k). Fitted within the can is a dual air bag (l). Upon deployment (see phanthom lines) the dual air bag (l) generates a first air bag portion l' to envelope the occupant and a second air bag l" which functions as a knee bolster. The dual air bag (l) is secured within the can by an exterior cover (m). Ends (n) of the air bag were first sewn together at location (o) forming a pouch into which an inner can (p) was inserted. Bolts (q) of the inner can (p) extended through openings in the sewn together ends (n) of the air bag and were fastened to a portion of the outer can (j). A gas generator was inserted into the inner can through openings in the sidewalls of the outer can and secured thereto by bolts.

It is the object of the present invention to provide an air bag assembly in which the gas generator may be inserted at times after the insertion of an air bag. A further object of the present invention is to provide an improved packaging methodology for securing an air bag within an assembly in its predeployment condition. It is an object of the invention to provide an assembly in which a reaction can is an optional element. A further object of the present invention is to provide an assembly capable of being mounted directly to the vehicle.

Accordingly a first embodiment of the invention comprises: an assembly comprising: a hollow cylindrical member or can including an opening into which generator means may be inserted. The generator means is of the type responsive to a control signal, for generating gas to inflate an air bag means. The assemble further includes air bag means, responsive to the gas, for protecting, when activated, an occupant of a vehicle, comprising an inflatable bag or sack, disposed in a compacted or stored condition, during periods prior to deployment, proximate a side of the cylindrical member containing at least one aperture. The inflatable bag, includes an open end disposed about the cylindrical member to receive the gas and includes relatively opposing flaps extending from proximate the open end and adapted to envelop the cylindrical member. The flaps, proximate a side of the cylindrical member, away from the at least one aperture, disposed in an overlapping, condition, one to the other. The assembly also includes means for maintaining the inflatable bag in its compacted or stored condition prior to inflation. The cylinder may be attached to a structural reaction can, a non-structural cover or shield or directly to a cavity formed within the instrument panel of a vehicle. The gas generator is thereafter fitted to the reaction can etc. In other embodiments of the a means for radially securing a gas generator is shown. In these emboidments the gas generator and related components may be directly attached to a structure avoiding the need to use a structural reaction can. Such means includes: a bent loop type of clamp, a flat band, radially extending studs or brackets. The air bag may be positioned in an enveloping manner directly about the gas generator or about an intermediate cylindrical member.

Many other objects and purposes of the invention will be clear from the following detailed description of the drawings.

BRIEF DESCRIPTION OF THE DRAWINGS

In the Drawings:

FIG. 1 is illustrative of the prior art.

FIG. 2 is illustrative of another prior art assembly.

FIG. 3 illustrates an assembly view of components comprising the present invention.

FIGS. 4a and b illustrate an assembled air bag assembly in accordance with the present invention.

FIGS. 5 and 6 illustrate alternate embodiments of the present invention.

FIG. 7 illustrates a plan view of the can.

FIG. 8 is a cross-sectional view through section A—A of FIG. 7.

FIG. 19 illustrates a cross-sectional view of some of the components illustrated in FIG. 17.

FIG. 20 illustrates still another embodiment of the invention.

FIG. 21 illustrates a further embodiment of the invention.

FIG. 22 illustrates still another embodiment of the present invention.

FIG. 23 illustrates a further embodiment of the invention.

DETAILED DESCRIPTION OF THE DRAWINGS

Figure 9:
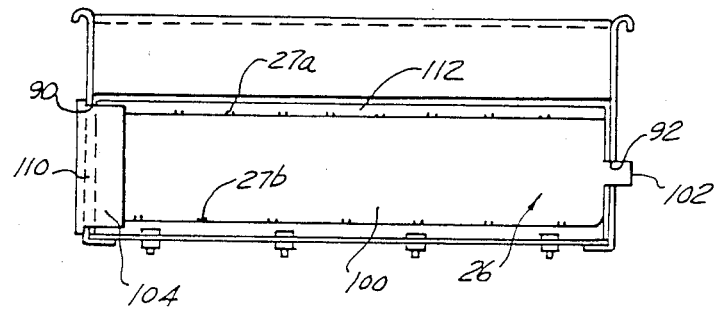
FIG. 9 is a cross-sectional view through section B—B of FIG. 8.

With reference to FIG. 3, there is a shown a number of components comprising an exemplary air bag assembly. The assembly 20 includes a first member such as a substantially hollow cylindrical member or can 22 having at least one open end 24a or 24b. As will be discussed in detail below the diameter of the cylindrical member 22 is sufficient to receive a gas generator 26 in a spaced relationship. The gas generator may include opposing sets of apertures 27a, b such that upon generation of the gas a reaction neutral condition is achieved. The cylindrical member serves as a heat shield and may include a plurality of apertures (at least one) 30, to permit the gas generated by the gas generator 26 to enter an air bag 32. The apertures 30 also function as a diffuser for the gas and may vary in shape and size (rectangular, circular, etc.). The assembly 20 further includes means for securing the cylindrical member 22 to a structure 40. In the present invention the structure 40 is optional and may form part of the assembly 20. Such securement means, generally shown as 34, may include a plurality of bolts or studs 36 (weld studs, pressed-in studs, etc.) extending through a rearward wall of the cylinder 22. One such structure 40 shown as acurately shaped is illustrated in FIG. 4. The electrical ground symbol is used to indicate that the structure 40 is adapted to be secured to a reinforced portion of the vehicle such as a reinforced portion of the instrument panel (not shown). Fasteners such as nuts 42 can be used to tighten the cylindrical member 22 to the structure 40. As can be appreciated, studs 36 and nut 42 can be replaced by a bolt extending through structure 40 and received into a threaded member carried by or integral with the cylindrical member 22.

The air bag 32 illustrated in FIG. 3 is shown diagrammatically and may differ with the specific design of an occupant restraint system. Characteristic of air bags generally is an enclosed end 44 which upon inflation envelopes and protects an occupant of a vehicle. The air bag may also include an open end generally shown as 46. During assembly of the air bag to the cylinder 22 the open end 46 will be juxtaposed relative to openings 30 so as to receive the gas from the gas generator 26. Positioned about the open end 46 are two relatively opposing flaps 50a and b. During the fabrication of the air bag a plurality of first and second sets 52a and 52b of apertures are formed within each of the respective flaps 50a and b. The apertures may be fabricated as part of the weaving process often used to form the air bag or introduced after the bag 32 is assembled by punching, melting or the like. The openings 52 are registered one to the other and to the securement means 34.

During the assembly of the air bag 32 to the cylinder 22, the open end 46 is laid proximate the opening 30. Thereafter the flaps 52 are placed about the cylinder 22 in overlapping, unbonded condition such as to envelope the exterior walls of the cylinder 22. In this overlapping or enveloping condition the plurality of openings 52a and 52b are aligned one to other and to the securement means. As an example if the securement means 34 comprises the studs 36, the apertures 52 are fitted over the studs 36. If the securement means comprises a threaded member in the cylinder 22, the apertures are aligned to the threaded member and a bolt is received therethrough. As discussed below, in an alternate embodiment of the invention the cylinder 22 is not used and the securement means is attached directly to the gas generator 26 with the flaps 50 enveloping the gas generator. In addition, the flaps 50 used need not be of the same size (length). Further, the placement of the apertures 52 in relation to the size of the flaps defines the mounting location of the air bag 32 to the cylinder 22 and to some extent will define the deployment trajectory of the air bag.

Upon attachment of the air bag to the cylinder 22, it must be folded or otherwise compacted to its predeployment or stored condition such as illustrated by numeral 54. To secure the air bag in its folded or compacted condition a covering of material 56 is wrapped about the folded air bag 54, cylinder 22, flaps 50 and securements means 34 thereby providing a completed sub assembly 58. Upon securement of the cylinder to the structure 40 this sub-assembly 58 is secured in place as illustrated in FIG. 4a. The material may be formed as a sack into which the air bag 32 is inserted or a band partially enveloping the air bag 32.

The material (sack, band, etc.) 56 is chosen of a material having a tensile strength sufficient to maintain the bag 32 in its predeployment condition. The strength of the material 56 is such that during initial deployment thereof, the deployment forces are sufficient to rupture it thereby permitting the bag 32 to expand with negligible restriction. The material used may be a plastic film, cloth or spun bonded olefin material such as that manufactured under the name of TYVEK manufactured by DuPont. FIG. 4b schematically illustrates a front view of the sub assembly 58 and in particular the band or sack 56. To enhance deployment of the air bag 32, the material 56 may include a pre-weakened area such as a tear seam, heat stress area or line of perforations all generally designated by numeral 60.

With reference to FIG. 3 the overlapping flaps 50 are shown as comprising a layer of uniform thickness material. Alternative embodiments are illustrated in FIGS. 5 and 6, which illustrate reinforced flaps. In FIG. 5 the ends 60a and b, of flaps 50a and 50b are folded over to form a hem-like structure. The respective hems 64a and b may be sewn at locations such as 62. As such, each of the hems 64a and b may be formed of a double layer of fabric each including apertures such as 52 to receive the securement means generally shown as 34. FIG. 6 illustrates a further embodiment in which respective bars or structural members 70a and b are inserted into the respective hems 64a and b as additional reinforcement. The bars or structural members 70a and b include openings 72a and b registered relative to the apertures 52 to receive the securement means 34.

In addition to the function of securing the bag 32 to the cylinder 22, the material 56 functions as a dust cover or shield to protect the air bag from dust and other particulates.

FIGS. 7–9 illustrate further features of the present invention. FIG. 7 is a plan view of an optional outer or reaction can or receptacle 80 into which the sub-assembly 58 is secured. The can 80 is functionally similar to the structure 40 shown in FIG. 4. In the embodiment show in FIG. 7 the can is sufficiently large to receive the entire assembly as opposed to the shortened size of structure 40. The can 80 comprises a walled member 82 having ends 84a and b. The bottom 86 of the can 80 includes a plurality of openings 87 through which the securement means 34 may extend. In the embodiment illustrated the securement means includes the studs 36 which are fastened to the can 80 by the nuts 42. FIG. 8 which is a cross-sectional view taken through section line A—A of FIG. 7 illustrates the sub-assembly 58 in place within the can 80. FIG. 9 is illustrative of an additional cross-sectional view taken through section line B—B of FIG. 8. These FIGS. 7 through 9 also illustrate the placement of the gas generator 26 with regard to the sub-assembly 58 and outer can 80. As can be seen from FIG. 9, the outer can 80 includes a large opening 90 formed within side 84a and a smaller opening 92 formed within side 84b. The gas generator 26 illustrated in FIGS. 7–9 comprises a central cylindrical portion 100, a threaded stud 102 adapted to be received within opening 94 and a larger flanged end 104. The stud 102 is secured to the can by a nut 106. The larger flanged end 104 is spaced from the can 80 by a resilent member preferably a non-metallic member such as a nylon ring or bushing (an O-ring might also be used) positioned about the flange and adapted to compressively fit within the opening 90. The ring 112 also functions as a vibration damper. Sub-assembly 58 is secured to the can so that the axis of cylinder 22 is substantially co-linear with the centers of openings 90 and 92. Thereafter the gas generator is slid within the outer can 80 through the larger opening 90 and then secured by the nut 106 and ring 112. In its assembled condition the central portion 100 of the gas generator 126 is spaced from the inner wall of the cylinder 22 (see numeral 112).

This spacing permits greater efficiency and distribution of the gas generated by the gas generator 26 and also spaces the air bag slightly away from the heat generated by of the gas generator. In addition, it is not necessary that the securement means 34 be disposed at approximately 180 degrees from the openings 30 or folded location of the air bag 54. Such securement means extending from the cylinder 22 may be located at other positions such as at locations 120, 122, etc. The can 80 may further include attachment means such as flanges 124a and b which may be used to attach the can to the dashboard or instrument panel 130 shown in phanthom line in FIG. 8.

The instrument panel or dashboard 130 (or for that matter the can 80) may further include a tearable or breakaway cover 132 (see phantom line) to cover the assembly 58, optional outer can 80, and gas generator 26. As illustated in FIG. 8, the outer can 80 is situated in the instrument panel such that its open end 88 is horizontal and substantially in the horizontal plane of the instrument panel. Upon deployment of the system shown in FIG. 8, the air bag 32 expands upwardly through the cover 132. Thereafter the air bag 32 impacts the windshield 134 and is deflected inwardly toward the occupant. It should be appreciated that the open end 88 can be disposed in other orientations such as on a vertical surface of the instrument panel. In this case, upon deployment, the air bag 32 would expand in a substantial horizontal manner directly toward the occupant.

Further, from the above, it can be appreciated that the major functions of the outer can 80 are: (a) to provide a cavity into which the sub-assembly 58 and gas generator 26 may be received; (b) to provide a structure onto which these components may be secured; (c) to provide a reaction member to absorb the reaction forces generated during the deployment of the air bag 32; and (d) by virtue of the angle of the wall 82 proximate the open end 88 to somewhat guide the direction of deployment of the air bag 32. These functions need not be satisfied by using a separate member such as they outer can 80. As such, and as mentioned before, the outer can 80 (or structure 40) are optional. It is within the scope of present invention that the outer can 80, per se, be formed as an integral part, i.e. cavity, of the dashboard or instrument panel. As an example, the instrument panel may iclude a cavity, having the shape of the can 80 into which the sub-assembly 58 and gas generator are secured.

FIGS. 10–16 illustrate another alternate embodiment of invention. In particular, these FIGURES illustrate, interalia, another means by which a gas generator such as 26 may be secured within an inner can or cylindrical member such as 22. More specifically the invention comprises a partial cylindrical member 200 comprising an arcuate wall 202 and ends 204a and b. Extending from the arcuate wall 202 are securement means generally shown as 206 which may include studs 208a and 208b. Positioned outboard of the securement means 206 are a plurality of openings to 210a and b the purpose of which will be clear from the discussion below. Extending across the wall 202, near its open end 212, are a plurality of openings to 220a and b. The cylindrical member 200 may be enclosed by a cover or a diffuser 230 having a plurality of openings 232 therein. The cover or difusser 230 may further include a plurality of hooks 234a and b adapted to respectively engage the plurality of openings 220a and b. The hooks 234b are not visible in FIG. 10. Upon attachment of the cover 230 to the cylinder 200, there is formed a fully shaped cylindrical member 240 as illustrated in the cross-sectional view shown in FIG. 12. The manner of securement of the cover to the partial cylindrical member 200 may be accomplished by other means such as bolting, welding, etc. Positioned within the cylinder 240 are attachment means 250 adapted to directly attach the gas generator 26 to the interior of the can 240 and for direct attachment to a cooperating structure.

The following illustrates some further examples illustrating various embodiments of the present invention. In one embodiment the attachment means comprises a clamp such as bent wire loop 260 having a diameter sufficient that a cylindrical gas generator can be pressfit or slid therein. As can been seen, the loop 260 provides a means for radially or circumferentially clamping the gas generator. The bent loop includes a straight extending threaded portion 262 which is received through the openings 210a and b of the cylinder 200 The attachment means are preferably positioned toward the outboard ends of the cylinder 200, however, an inboard location may be used. For efficiency of design the attachment means comprises two such bent loops. The loops are secured to the cylindrical member 200 by appropriate fasteners 264. Upon attachment to the cylinder, the straight ends of the bent loop will extend outwardly in a manner similar to that of the studs 36. The fasteners 264 in combination with the straight portions of the bent loop permit the securement of the cylinder 200, 240 to a structure such as 40, the outer can 80, or directly to a reinforced member on the instrument panel. The inherent thickness of the bent loop provides for a radial offset between the gas generator and cylinder 240.

Figure 10:
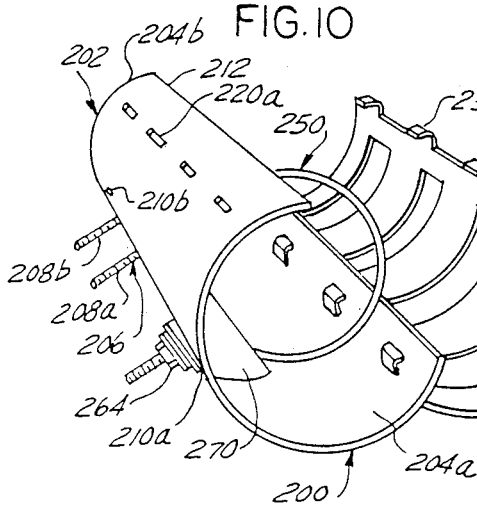
FIG. 10 illustrates an alternate embodiment of the invention. More particularly, there is illustrated a projected view of a two piece cylinder.
Figure 11:
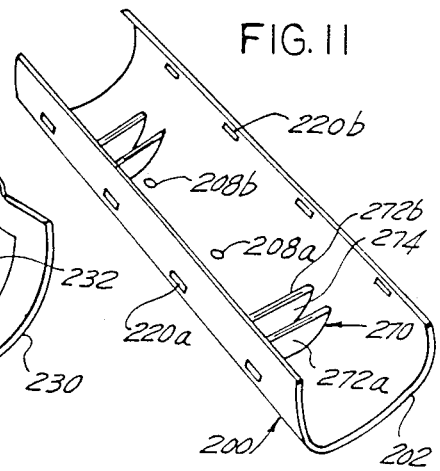
FIG. 11 illustrates a top projected view of one portion of the two piece cylinder shown in FIG. 10.
Figure 12:
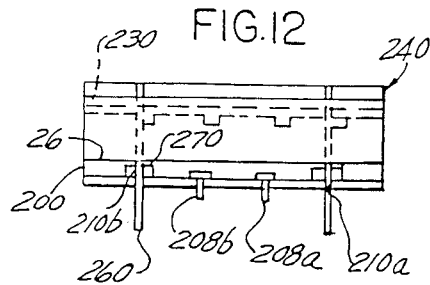
FIG. 12 illustrates a front plan view of an assembled cylinder.
Figure 13:
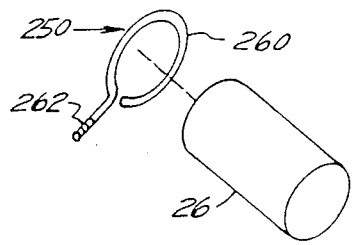
FIG. 13 illustrates a ring fastener usable within the invention of FIG. 10.
Figure 14:
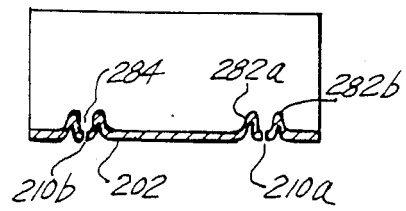
FIG. 14 illustrates an alternate embodiment of the invention.

As an option, it may be desireable to more positively fix the orientation of the attachment means such as the bent loops to the cylinder. FIGS. 10-12 illustrate a grooved insert 270 welded or otherwise attached to the inner surface of the wall 202. Each insert 270 comprises two upraised bosses 272a, b forming therebetween a groove 274, into which a respective one of the bent loops is received. The shape of the exterior portion of the bosses may be conformly shaped to match the exterior profile of the gas generator 26 or straight as illustrated in FIGURES. An alternate to using a separate insert attached to the cylinder 200 is to fabricate the cylinder 200 with an integral bosses 282a, b and groove 284 formed by portions of the wall 202 as shown in FIG. 14. The grooves 274 or 284 being formed adjacent (over, next to, etc.) the location of the openings 210.

Figure 15:
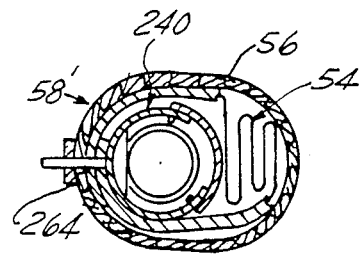
FIG. 15 illustrates an assembly of various components comprising the present invention.

In operation the attachment means such as the loops 260 are inserted in openings 210 and within (or proximate) their respective grooves 274 or 280 if used. The cover 230 may then be secured to the cylinder 200 forming the completed cylindrical structure 240 generally shown in FIG. 12. Thereafter the air bag 32 with overlapping flaps 50 and openings 52 would be positioned to envelope the completed cylinder 240 with the studs 208 and bolts 210 extending therethrough. The folded air bag 54 may be maintained in its stored, predeployment condition by use of a material 56 which similarly envelopes the air bag and cylinder 240 in a manner similar to that above, thereby completing a sub-assembly generally designated as 58'. As described above, the assembly 58 or assembly 58' prime can be inspected, stored, etc. separate from the gas generator. Prior to insertion of the sub-assembly 58' into the vehicle, the gas generator may be slid through the loops 260 completing the sub-assembly. The final securement of the gas generator to the cylinder 240 is achieved by tightening the nuts 264 as shown in FIG. 15.

The embodiment of the invention illustrated in FIGS. 10-15 offers a distinct advantage because of its compact size. In addition, the use of the clamp such as the bent loop 60 or insert 270 and/or walls about the groove 280 permit the gas cylinder 26 to be spaced from the inner walls of the cylinder 240 thereby enhancing the generation and distribution of the gases. Further, this embodiment of the invention eliminates the use of an outer can as a means for securing and locating the gas generator 26. If it is desireable, however, to use a cover or shield, similar in shape to the can 80, this cover or shield need not be made of a structural material since in this embodiment the cover or shield would not transmit air bag deployment forces to the vehicle. Such forces are transmitted directly through the studs 208 and 210.

Figure 16:
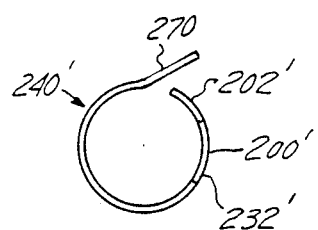
FIG. 16 illustrates another alternate embodiment of the invention.

Reference is made to FIG. 16 which illustrates a further embodiment of the invention. As previously described in FIGS. 10 and 12, the assembled cylinder or can 240 is fabricated of two interdigitating parts, i.e., 200 and 230. The embodiment illustrated in FIG. 16 illustrates a cylinder 240' fabricated of a single structure. More particularly, the cylinder 240' may be fabricated of a rolled sheet of material such as steel that may include preformed openings 232' formed in a portion of the wall 202'. The sheet is rolled into a partial cylindrical shape such as illustrated in FIG. 16. The cylinder 240' includes an extension or flap 270 which may be later rolled over and secured to an opposing surface of the wall 202'. The attachment means such as a clamp or the loops 260 may be positioned within the cylinder prior to the securement of the flap 270 or alternatively, they may be inserted within the completed cylinder 240' after securement of the flap 270. In this case the loops 260 would be inserted through the respective ends 204 of the completed cylinder 240'.

The completed sub-assembly 58' (with the gas generator 26 in place) provides a structually sound apparatus which may be fastened directly to and/or within a cavity formed within the instrument panel. Alternatively, as discussed above, the sub-assembly 58' (with gas generator) can be inserted in an outer can, cover or shield described above. It should be appreciated, however, that the outer can, cover or shield used with this embodiment need not include the side openings shown in FIGS. 7-9.

Figure 18:
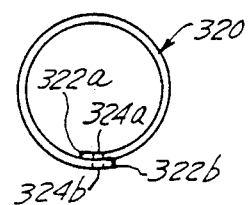
FIG. 18 illustrates a front plan view of a strap or band usable within the invention of FIG. 17.
Figure 17:
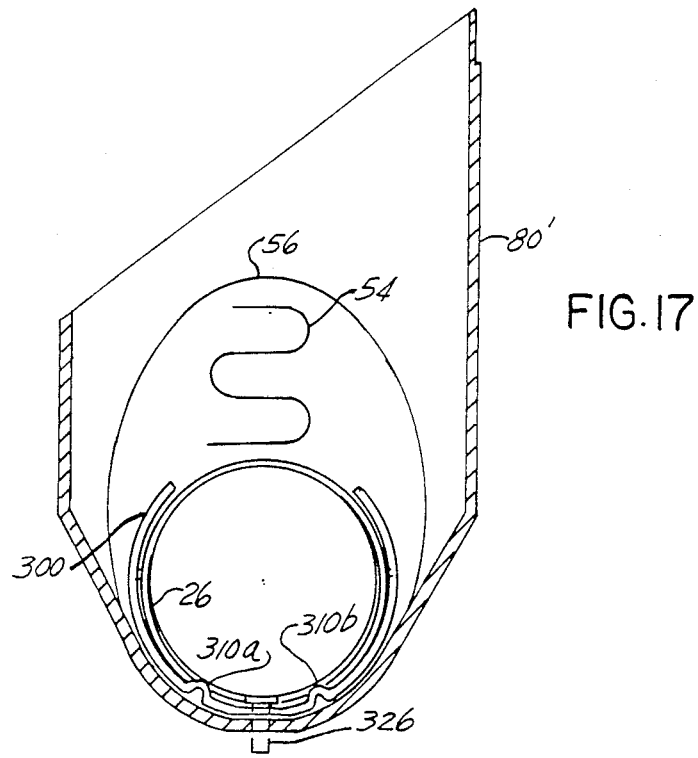
FIG. 17 is a cross-sectional view illustrating a further embodiment of the present invention.

FIGS. 17-19 illustrate further improvements in air bag assemblies. There is illustrated an inner cylinder or can 300. The cylinder 300 is formed by an arcuate wall 302 defining an axial extending open end 304. The open end 304 extends toward the folded bag 54. As described above, a material (band, cover) 56 may be used to secure the folded bag 54 in place. Extending from the wall 302 may be studs 208a and b as illustrated in FIG. 10. These studs, i.e., attachment means, are not shown in FIGS. 17 or 19. Positioned preferably outboard of the location of the studs which are shown by the dotted lines 306a and b in FIG. 19 are protrusions or dimples 310a and b formed within the wall 302 of the cylinder 300. Positioned outboard of the protrusions 310 are openings 312a and b. Mounted within the cylinder 300 proximate the openings 312 are clamps formed as substantially flat bands or straps 320 that are preferably fabricated of a structural material such as steel. One of these bands or straps 320 is illustrated in FIG. 18. Proximate the ends 322a and b of the band 320 are respective openings 324a and b. Prior to insertion of the band 320 within the cylinder 300 the band 320 is formed as a loop (see FIG. 18) and a bolt or stud such as bolt 326 is inserted therethrough. The band 320 and bolt 326 are inserted within a respective one of the openings 312. The air bag 32 and material (band, cover) 56 may be secured to the cylinder or can 300 in the manner described above. At such time as the gas generator 26 is inserted within the can 300, the bolt 326 is tightened by means of a nut or similar fastener thereby drawing the band 320 and the gas generator 26 and towards the bottom of the cylinder 300. The tightening of the band 320 also urges the gas generator 26 against the projections 310 firmly securing the same. The projections 310 further serve to space the gas cylinder 26 from the interior of the cylinder 300.

It should be appreciated that the partially open cylinder or can 300 can be replaced by the cylinder or can 240 shown in FIGS. 10 and 12, or by the single piece cylinder or can 240' shown in FIG. 16. With reference to FIG. 17, the cylinder 300, gas generator 26, air bag 34 (54) is shown mounted within an optional outer can 80'. In this embodiment the above components are inserted within the can and the final tightening of the gas generator to the cylinder 300 is performed during the attachment of the cylinder 300, etc. to the outer can 80'. As described above, the separate outer can 80' may be optionally used or the cylinder 300 (with gas generator and air bag in place) may be directly secured to the instrument panel or other reinforced portion of the vehicle.

From the above it can be appreciated that the loops 260 and straps 320 provide for a substantially continuous (point by point) radial securement about the circumference of a gas generator. The following FIGURES illustrate an alternate radial securement in which the gas generator is secured generally at a single point radial attachment about its circumferences. FIG. 20 illustrates another combination 350 for securing a gas generator to a cylindrical member. As illustrated the gas generator 26' includes a reinforced wall portion 352. The reinforced wall portion 352 may be formed as an extension to the main body of the gas generator 26' such as by extruding. The gas generator 26' may optionally be mounted to a cylindrical member such as 200'. Any of the above described cylindrical members (see FIGS. 10, 16 and 17) can be used. The gas generator 26' can be secured to the cylindrical member 200' by fasteners (studs) 354 received through openings 362. In this manner the nut portion 362 can be used to secure thread portion 360a to the gas generator while portion 360b remains available for attachment to a structure such as 40, 80 or 130. In this embodiment of the invention a completed assembly or sub-assembly would further include an air bag such as air bag 32 illustrated in FIG. 3. The flaps 50a and b of air bag 32 would then be mounted to the gas generator 26' and cylindrical member 200' in an overlapping manner as described above. A material 56 (band, cover) would then secure the folded air bag 54 in its stored or predeployment condition. The resulting assembly or sub-assembly would look much like the aperatus shown in FIG. 4A. The fasteners (studs) 354, as mentioned above, would be attached to a structural reaction can such as 80 or a non-structual cover or shield or fitted within a cavity or recess formed within the instrument panel 130. As mentioned above, the cylindrical member 200' is optional. FIG. 21 illustrates an alternate embodiment of the invention wherein the fasteners 354 are mounted directly to the gas generator 26'. The air bag 36 and material cover 36 would be attached directly to the gas generator 26' with the openings 52 in the flaps 50 of the air bag 32 fitted over the fasteners 354. Upon activation of the gas generator 26' the gas so generated would enter directly into the air bag 34. It should be appreciated that the gas generator 26' need not include the reinforced wall portion 352. In this case the fasteners 354 would be inserted directly into the wall of the gas generator 26' wherein such wall would be of uniform, perhaps circular, cross section.

With reference to FIG. 22 there is shown a further embodiment of the present invention. More particularly, there is shown a cylindrical gas generator 26" having apertures 27a and b for the release of gas. Formed about the gas generator 26 are cylindrical standoffs or bosses 360. These bosses 360 may be attached to the gas generator 26" or formed as an integral part thereof. These bosses may also be formed as an insert molded plastic component during the formation of the gas generator 26" which is typically fabricated of an aluminum alloy. Extending from the bosses 360 are attachment means such as studs 354. In this embodiment of the invention the gas generator may be attached directly to a structure such as 40 or 80 or directly to the instrument panel 130. Prior to attachment the air bag 32 with flaps 50 are positioned to envelope the gas generator 26" and bosses wherein the apertures 52 of the flaps 50 are aligned to the attachment means 354. As can be appreciated, the studs or bolts 354 can be inserted into a threaded hole within each of the bosses 360. The bosses 360 serve to space a portion of the air bag from the orifices 27a and b.

FIG. 23 illustrates another means for radially attaching the gas generator 26". Brackets 360 extend radially outward from the ends of the gas generator for securement to a supporting structure. In this case the studs 354 would be used only to secure the air bag 32 to the gas generator.

Many changes and modifications in the above described embodiment of the invention can of course be carried out without departing from the scope thereof. Accordingly, that scope is intended to be limited only by the scope of the appended claims.

We claim:
1. An assembly comprising:
   a hollow cylindrical member or can including an opening into which generator means may be inserted, the generator means of the type responsive to a control signal, for generating gas to inflate an air bag means;
   air bag means, responsive to the gas, for protecting, when activated, an occupant of a vehicle, comprising an inflatable bag or sack, a portion thereof being disposed in a compacted or stored condition, during periods prior to deployment, proximate a side of the cylindrical member containing at least one aperture, the inflatable bag, including an open end, generally opposite the compacted portion, disposed about the cylindrical member to receive the gas and including relatively opposing flaps extending from proximate the open end and adapted to envelop a portion of the cylindrical member, the flaps, proximate a side of the cylindrical member, away from the at least one aperture, disposed in an overlapping, condition, one to the other.

2. The assembly as defined in claim 1 comprising:
   means for maintaining the inflatable bag in its compacted or stored condition prior to inflation.

3. The assembly as defined in claim 1 comprising:
   means for maintaining the inflatable bag in its compacted or stored condition prior to inflation, comprising
   a material enveloping the compacted portion, flaps and cylindrical member, the material having sufficient tensile strength to maintain the bag in its compacted orientation prior to inflation relative to the cylindrical member and capable of being ruptured or otherwise opened by the bag during inflation thereof.

4. The assembly as defined in claim 3 wherein the material includes a weakened area to enhance or define the area of rupture.

5. The assembly as defined in claim 4 wherein including a plurality of fasteners extending from the wall of the cylindrical member and wherein the cylindrical member with gas generator means, inflatable bag and material are directly mounted to a reinforced portion of a vehicle.

6. The assembly in claim 5 wherein the cylindrical member (inflator means, inflatable bag and material) are received within a cavity formed in the instrument panel or dashboard of the vehicle.

7. The assembly as defined in claim 3 wherein the weakened area includes one of: a preformed tear line, a line of perforations or a heat stressed area.

8. The assembly as defined in claim 3 wherein the material is of a group of materials including plastic film, cloth and a spun bonded olefin.

9. The assembly as defined in claim 1 including means for attaching the cylindrical member to a structure wherein the attaching means also provides a means for securing the material enveloping the inflatable bag and cylindrical member.

10. The assembly as defined in claim 9 wherein each flap includes a set of apertures such that when the flaps are in the overlapping condition each set of apertures are aligned one to the other in a manner to coact with the attaching means to be secured against the cylindrical member.

11. The assembly as defined in claim 10 wherein the attaching means includes a plurality of fasteners extending out from the wall of the cylindrical member, such fasteners adapted to be received a set of aligned apertures in a structure.

12. The assembly as defined in claim 11 wherein fasteners are situated approximately 180 degrees from at least one aperture.

13. The assembly as defined in claim 12 wherein the fasteners are situated at an angle other than 180 from at least one aperture.

14. The assembly as defined in claim 9 including reaction can means for receiving an assembled cylindrical member, inflatable bag and material, and wherein a portion of the reaction can means functions as a means for assisting in controlling the direction in which the inflatable bag expands.

15. The assembly as defined in claim 14 wherein the inflator means is positioned within the reaction can and cylindrical member after attachment of the cylindrical member to the reaction can.

16. The assembly as defined in claim 15 wherein the reaction can means includes sidewalls including respective openings to receive the inflator means.

17. The assembly as defined in claim 16 includes first means for attaching the inflator means to the reaction can means proximate the sidewall openings.

18. The assembly as defined in claim 17 wherein one side of the inflator means includes a threaded stud adapted to be received through one of the sidewall openings for securement to the reaction can means.

19. The assembly as defined in claim 18 wherein a portion of the inflator means, proximate the other sidewall opening is secured to the reaction can means by a resilient coupling means for reducing vibration.

20. The assembly as defined in claim 19 wherein the resilient coupling is a nylon ring.

21. The assembly as defined in claim 14 wherein the reaction can means includes an arcuate wall and opposing sidewalls, the wall and sidewalls defining an open end through which the inflatable bag expands.

22. The assembly as defined in claim 21 wherein an additional set of apertures is located in the arcute wall to receive a corresponding set of fasteners extending from the cylindrical member and wherein means are provided to secure the set of fasteners to the wall.

23. The assembly as defined in claim 21 wherein a first set of apertures is located in the wall, and wherein means for fastening the cylindrical member extend through the arcuate wall and are received into the wall of the cylindrical member.

24. The assembly as defined in claim 21 wherein the reaction can means includes means for permitting same to be mounted directly to a reinforced portion of a vehicle.

25. The assembly as defined in claim 1 further including the inflator means.

26. The assembly as defined in claim 25 wherein the inflator means is inserted into the cylindrical member after securement of the inflatable bag to the cylindrical member.

27. The assembly as defined in claim 26 wherein the inflator means includes a first plurality of openings in a first portion thereof through which the gas exits.

28. The assembly as defined in claim 1 further including an inflator means wherein the inflator means is inserted into the cylindrical member after securement of the inflatable bag to the cylindrical member and wherein the inflator means includes a first plurality of openings in a first portion thereof through which the gas exits and wherein the first portion is spaced from the wall of the cylindrical member.

29. The assembly as defined in claim 28 wherein the inflator means includes a second plurality of openings disposed relative to the first plurality of openings so as to render the inflator means, during the generation of gas, in a thrust neutral condition.

30. A method of assembling an air bag assembly, the method including the steps of:
(a) providing a cylindrical member,
(b) providing an inflatable bag including opposingly situated flaps positioned about an open end thereof
(c) positioning the bag proximate the cylindrical member,
(d) overlapping the flaps about one another to at least partially envelop the cylindrical member,
(e) compacting that portion of the inflatable bag which expands into a specific volume in positional relationship to the cylindrical member,
(f) enveloping the cylindrical member and compacted inflatable bag with a material capable of being ruptured.
(g) securing the bag and material to the cylindrical member.

31. The method as defined in claim 30 including the step of inserting a gas generator into the cylindrical member.

32. The method as defined in claim 31 including the step of securing the gas generator in a spaced relation to the cylindrical member.

* * * * *